(No Model.) 2 Sheets—Sheet 1.

W. HARTY.
SPRING TESTING MACHINE.

No. 277,898. Patented May 22, 1883.

WITNESSES:
Francis A. Sims
Charles N. Taylor

INVENTOR:
William Harty
by Austin F. Park
attorney.

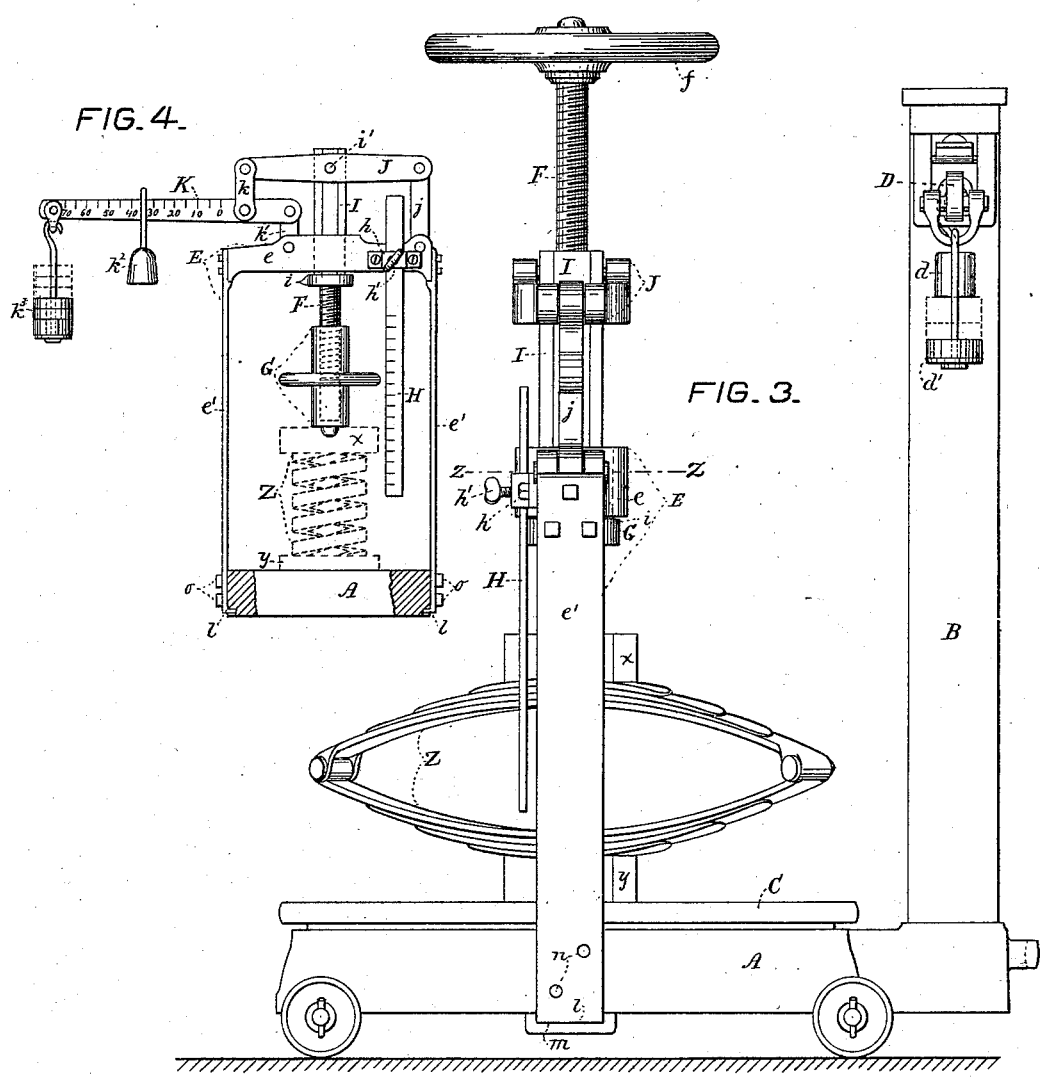

UNITED STATES PATENT OFFICE.

WILLIAM HARTY, OF PORTSMOUTH, OHIO.

SPRING-TESTING MACHINE.

SPECIFICATION forming part of Letters Patent No. 277,898, dated May 22, 1883.

Application filed October 24, 1882. (No model.)

*To all whom it may concern:*

Be it known that I, WILLIAM HARTY, a citizen of the United States, residing at Portsmouth, in the county of Scioto and State of Ohio, have invented certain new and useful Improvements in Spring-Testing Machines, of which the following is a specification, reference being had to the accompanying drawings.

My invention relates to improvements in mechanisms for testing and measuring the strength and elasticity of elliptic, spiral, and other springs for carriages, railway-cars, and other purposes; and the general object of my improvements is to produce a simple and cheap mechanism by which a person can easily and quickly measure the strength and elasticity or carrying capacity and test the evenness of action of such springs of various sizes under different degrees of compression.

Figure 1:
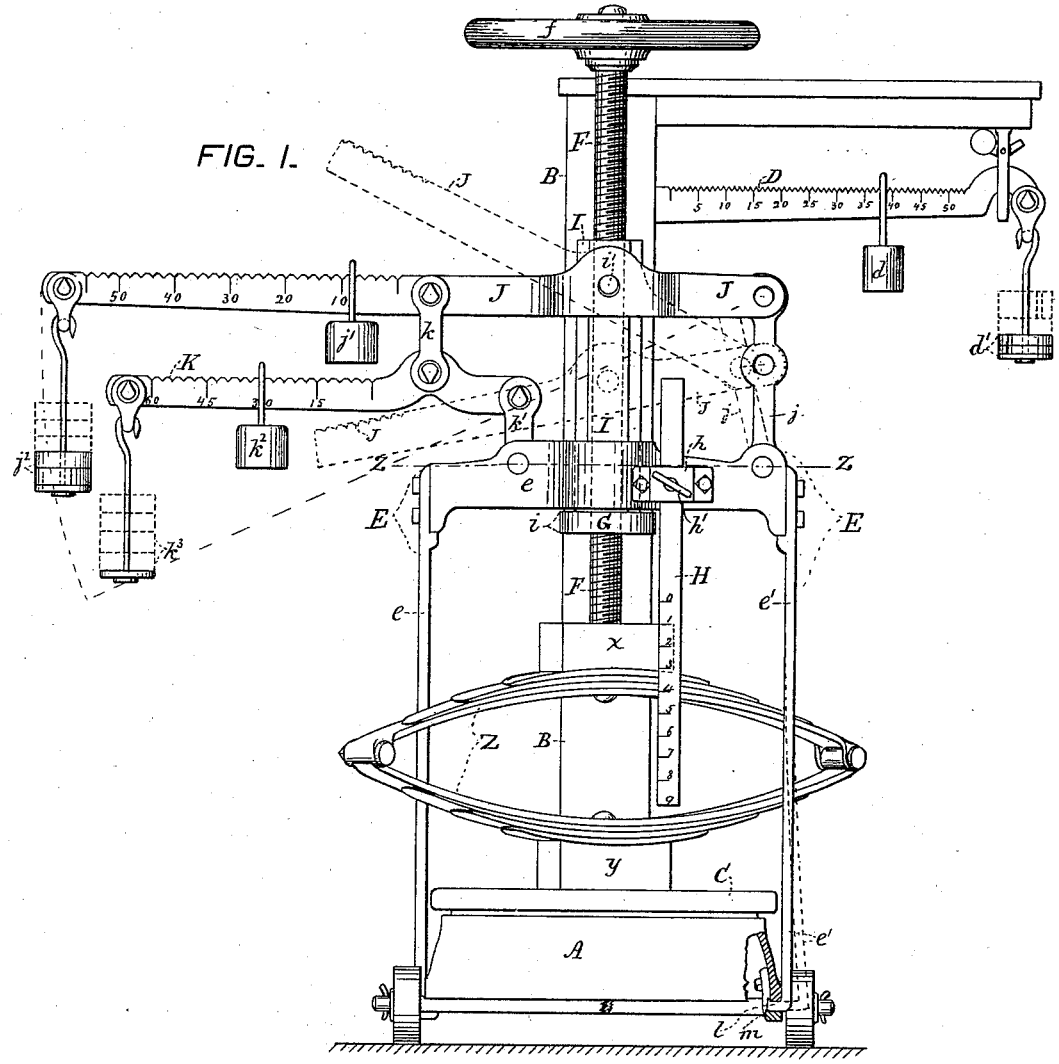
Figure 2:
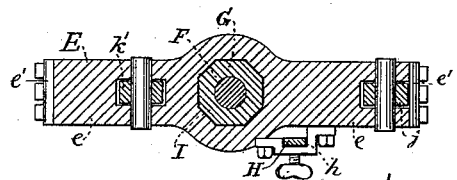

In the accompanying drawings, Figure 1 shows an elevation of one side of a mechanism which embodies one form of my invention, and Fig. 2 is a plan of a section of the same at the line $z\ z$. Fig. 3 represents an elevation of another side of the mechanism shown in Fig. 1. Fig. 4 is an elevation of a mechanism which embraces some parts of my invention.

A is the base, B the standard, C the gravitating platform mounted on the base, and D the graduated beam, furnished with movable poises $d\ d'$ and connected by leverage devices with said platform, all of a common platform weighing-scale, which can be of the well-known "Howe," "Fairbanks," or other suitable kind.

E is a frame secured to the base A, and extending over that base and the platform C of the weighing-scale.

Z is a spring which is to be tested, and is supported by a block, $y$, on the platform, and arranged under the top bar, $e$, of the frame.

In Figs. 1, 2, and 3, F is a screw having a hand-wheel, $f$, and mounted to be rotated to and fro in a suitable nut, G, in or on the bar $e$ of frame E, and extending below that bar and against a block, $x$, on the spring Z, so that by turning the screw in opposite directions the screw will be forced endwise toward and from the platform, and will compress and relax the spring. Upon thus compressing a spring, Z, upon the platform C of the weighing-scale by means of the frame E on base A and screw F in said frame, the amount of elasticity in the spring when compressed to different degrees can be quickly and accurately measured and indicated in pounds by the graduated beam D and poises $d\ d'$ of the weighing-scale.

To provide means for easily measuring and showing the various degrees or extents to which springs of different sizes or heights shall be compressed on the platform by the screw F or its equivalent, I secure to the frame E a graduated rod or measuring-scale, H, perpendicular to the platform C, and near to the lower end portion of said screw, or its equivalent, and make the scale H adjustable endwise on the frame by suitable means—as, for instance, by having the scale H fit easily through a socket, $h$, Fig. 2, on the frame furnished with a set-screw, $h'$.

To provide simple and cheap means by which a person can easily and quickly ascertain whether springs of various sizes will or will not work smoothly or properly in use, or in being greatly compressed and relaxed, I combine with a platform or support, A or C, for the spring, and the frame E, connected with and extending over said support or platform, a slide, I, mounted in the frame E and movable downward and upward therein, and limited in its upward movements by a collar or stop, $i$, thereon, or by other suitable means, and furnished with and carrying the combined screw and nut F G, and connect a lever, J, by a link, $j$, with the frame E, and by pivots $i'$ with the slide I, or by equivalent devices. Consequently when the screw F, Fig. 1, or the nut G in Fig. 4, shall be turned down upon a spring, Z, on the platform or support, so as to hold up the slide I, with its stop $i$, against the frame E, a person can by hand move the lever J, and by it the slide I and screw and nut F G, downward instantly, and thereby at once greatly compress the spring, and can then release the spring by lessening the pressure on the lever J, and can thereby quickly and surely feel and ascertain the working condition of the spring, as to its smoothness and regularity of action, especially when the lever J shall have a long movement, as when arranged and connected with the frame E, as indicated by dotted inclined lines in Fig. 1, and as I commonly prefer when the lever J shall not be used in measuring the strength or elasticity of the spring under different degrees of compression. When a spring is thus compressed upon the gravitating platform C of the weighing-scale by means of the frame E, combined screw and nut F G, slide I, and lever J, the degrees of elasticity of the spring under different extents of compression can be readily measured by the graduated beam D and poises $d$ $d'$ of the weighing-scale, and at the same time the graduated scale H will indicate the extent to which the spring shall be compressed.

To provide means for measuring the elasticity of a spring compressed upon a support, A, by means of a frame, E, connected with said support, slide I, combined screw and nut F G, carried by the slide, and lever J, connected with said slide and frame, substantially as described, without requiring the beam and poises of a platform weighing-scale to be used, the lever J, or a second lever, K, connected to the lever J by a link, $k$, and to the frame E by a link, $k'$, is suitably graduated and furnished with poises $j'$ $j^2$ or $k^2$ $k^3$, substantially as indicated in Figs. 1 or 4; or, for the same purpose, both of those levers can be graduated and furnished with poises, as in Fig. 1.

The poises $j'$ $j^2$ and the lever K can be detached from the lever J and reapplied thereto, so that the lever J can be used with or without the lever K and poises $j'$ $j^2$.

As regards this invention, the screw F can be fast to the slide I, as in Fig. 4, and the nut G adapted to be rotated and thereby moved down and up on the screw, to compress and release the spring Z, as indicated in that figure; but I generally prefer to have the nut G fast on or in one piece with the slide I, and the screw F extended through that slide and adapted to be rotated and thereby moved down and up therein, to compress and release the spring, as shown in Fig. 1.

To provide simple means whereby the combined frame E, slide I, screw and nut F G, and lever J can be quickly secured to and removed from the base of a platform weighing-scale or other suitable support, I compose the frame E of the top bar, $e$, and two opposite standards, $e'$ $e'$, firmly fastened at their upper end parts to the bar $e$, and one or each somewhat elastic laterally, and both having their lower end parts, $l$, flattened and bent inward or formed to fit in suitable lateral sockets, $m$, Figs. 1, 3, 4, in or on the supporting-base A, and to be held therein by the tendency of one or each of the standards to spring inward, and yet so that the frame E can be readily detached from the supporting-base A by merely springing outward one or both of the standards $e'$, so as to thereby withdraw and remove one or both of the end parts $l$ from the socket or sockets $m$. The standards $e'$ can have holes $n$, Fig. 3, to permit them to be fastened to a base, A, Fig. 4, by headed screw-bolts $o$.

What I claim as my invention is—

1. The combination, with a weighing-scale having a base, A, and a gravitating platform, C, supported on said base and connected with the scale-beam, of a frame, E, on said base and extending over said platform, a slide, I, arranged in said frame and limited in its upward movement, and a combined screw and nut, F G, carried by said slide and adapted to compress and release a spring upon said platform, substantially as described.

2. The combination, with a platform weighing-scale, of a frame, E, applied to the base of said scale and extending over its gravitating platform, combined screw and nut F G, mounted on said frame over said platform, and measuring-scale H, secured to and arranged and adjustable on said frame and in respect to said platform and combined screw and nut, substantially as described.

3. The combination, with a base for supporting a spring to be tested, of a frame connected with and extending over said base, slide I, arranged in said frame and limited in its upward movement, combined screw and nut F G, carried by said slide, and lever J, connected with said slide and frame, substantially as set forth.

4. The combination, with a base for supporting a spring to be tested, of a frame, E, connected with and extending over said base, slide I, arranged in said frame and limited in its upward movement, combined screw and nut F G, carried by said slide, lever J, connected with said slide and frame, and measuring-scale H, secured to and arranged and adjustable on said frame and in respect to said base, slide, and combined screw and nut, as set forth.

5. The combination, with a platform weighing-scale, of a frame, E, connected with the base and extending over the platform of said scale, slide I, arranged in said frame over said platform and limited in its upward movement, combined screw and nut F G, carried by said slide, and lever J, connected with said slide and frame, substantially as described.

6. The combination, with a base for supporting a spring to be tested, frame E, connected with and extending over said base, slide I, arranged in said frame and limited in its upward movement, combined screw and nut F G, carried by said slide, and lever J, connected with said slide and frame, graduated, and furnished with movable poises, substantially as described.

7. The combination, with a base for supporting a spring to be tested, a frame, E, connected with and extending over said base, slide I, arranged in said frame and limited in its upward movement, combined screw and nut F G, carried by said slide, lever J, connected with said slide and frame, and lever K, connected with said frame and the lever J, and graduated and furnished with movable poises, substantially as set forth.

8. The device composed of the top bar, $e$, slide I in said bar, combined screw and nut F G, carried by said slide, lever J, connected to said slide and bar, and laterally elastic standards $e'$, fastened at one end part to said top bar, and having their other end parts formed for engagement with and disengagement from lateral sockets on a base for supporting a spring to be tested, substantially as set forth.

In testimony whereof I hereunto set my hand, in the presence of two subscribing witnesses, this 11th day of October, 1882.

WILLIAM HARTY.

Witnesses:
 JOS. W. HARTY,
 GEORGE HAWS.